United States Patent
Togashi et al.

(10) Patent No.: US 9,302,705 B2
(45) Date of Patent: Apr. 5, 2016

(54) STEERING FORCE CONTROLLER

(71) Applicant: Nissan Motor Co., Ltd., Kanagawa (JP)

(72) Inventors: Hiroyuki Togashi, Tokyo (JP);
Tomohiko Usui, Kanagawa (JP); Satoshi Miura, Kanagawa (JP); Kazuhisa Tadakuma, Tochigi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/425,569

(22) PCT Filed: Aug. 12, 2013

(86) PCT No.: PCT/JP2013/004841
§ 371 (c)(1),
(2) Date: Mar. 3, 2015

(87) PCT Pub. No.: WO2014/038139
PCT Pub. Date: Mar. 13, 2014

(65) Prior Publication Data
US 2015/0203153 A1      Jul. 23, 2015

(30) Foreign Application Priority Data
Sep. 4, 2012   (JP) .................................. 2012-194566

(51) Int. Cl.
*B62D 6/00*    (2006.01)
*B62D 5/06*    (2006.01)
(Continued)

(52) U.S. Cl.
CPC .............. *B62D 6/008* (2013.01); *B62D 5/0463* (2013.01); *B62D 5/064* (2013.01); *B62D 5/065* (2013.01); *B62D 6/02* (2013.01); *B62D 6/04* (2013.01); *B62D 6/08* (2013.01)

(58) Field of Classification Search
CPC ...... B62D 5/0463; B62D 5/064; B62D 5/065; B62D 6/08; B62D 6/02; B62D 6/04; B62D 6/008

USPC .......................... 701/41, 42, 43; 180/444, 446
See application file for complete search history.

(56) References Cited

U.S. PATENT DOCUMENTS

| 2005/0209752 A1* | 9/2005 | Ono ........................ B62D 6/003 701/41 |
| 2006/0006020 A1 | 1/2006 | Ono et al. |

(Continued)

FOREIGN PATENT DOCUMENTS

| JP | 2006-021562 A | 1/2006 |
| JP | 2008-055967 A | 3/2008 |

(Continued)

OTHER PUBLICATIONS

International Search Report issued in corresponding PCT application No. PCT/JP2013/004841, mailed Nov. 12, 2013 (7 pages).

(Continued)

*Primary Examiner* — Marthe Marc-Coleman
(74) *Attorney, Agent, or Firm* — Osha Liang LLP (57) ABSTRACT

A steering force controller has a first detection unit that detects a steering angular velocity of a vehicle, a second detection unit that detects a steering angle of the vehicle, a third detection unit that detects a vehicle speed of the vehicle, a main control matrix in which a first output value is set based on the steering angular velocity and the vehicle speed, a subsidiary control matrix in which a second output value is set based on the steering angle and the vehicle speed, a control quantity operation unit that obtains a control quantity for steering assistance by multiplying the first output value by the second output value and a steering assist force control unit that generates a steering assist force in a steering system based on the control quantity obtained by the control quantity operation unit.

9 Claims, 8 Drawing Sheets

(51) Int. Cl.
- *B62D 5/065* (2006.01)
- *B62D 6/02* (2006.01)
- *B62D 6/04* (2006.01)
- *B62D 6/08* (2006.01)
- *B62D 5/04* (2006.01)

(56) References Cited

U.S. PATENT DOCUMENTS

| | | | |
|---|---|---|---|
| 2006/0086561 A1* | 4/2006 | Hidaka | B62D 5/008 180/446 |
| 2008/0059026 A1 | 3/2008 | Akiyama | |

FOREIGN PATENT DOCUMENTS

| | | |
|---|---|---|
| JP | 2008-114749 A | 5/2008 |
| JP | 2008-282346 A | 11/2008 |
| JP | 2010-179800 A | 8/2010 |

OTHER PUBLICATIONS

Written Opinion issued in corresponding PCT application No. PCT/JP2013/004841, mailed Nov. 12, 2013 (4 pages).

International Preliminary Report on Patentability issued in corresponding PCT application No. PCT/JP2013/004841, mailed Mar. 7, 2014 (17 pages).

* cited by examiner

STEERING FORCE CONTROLLER

CROSS-REFERENCE TO RELATED APPLICATIONS

The present application is a national stage application of PCT Patent Application No. PCT/JP2003/004841, which claims foreign priority from Japanese Patent Application No. 2012-194566 filed on Sep. 4, 2012, the contents of which is incorporated herein by reference in its entirety.

BACKGROUND

1. Technical Field

The present invention relates to a steering force controller, more particularly to a steering force controller configured to give a driver a more linear steering feel.

2. Related Art

In a steering force controller, in one technology, either a steering angle of a steering wheel or a steering angular velocity or both of them are detected, and in addition, a steering assist force generated in a steering assist motor generating the steering assist force is detected. Either the detected steering angle or the detected steering angular velocity or both of them, and the steering assist force are used to control the steering assist motor, in general (see PLT 1 and PTL 2).

CITATION LIST

Patent Literature

PLT 1: JP 2010-179800 A
PLT 2: JP 2008-55967 A

SUMMARY

Here, in a configuration in which only the steering angle, from the steering angle and the steering angular velocity, is solely used to control the steering assist force, an electrical current to be supplied to the steering assist motor is set to 0 when the steering wheel is located at near the neutral position (i.e., straight travel state) for fuel efficiency. Thus, the fuel efficiency can be improved, but the steering assist motor stops at near the neutral position. Therefore, the steering angle is generated and then the electrical current value is raised from 0 to control the motor torque. For this reason, the intervention timing of the steering assist force is delayed. In steering from the straight travel state, the steering at the start up timing becomes heavy. In order to deal with this issue, a conceivable measure is that the resolution to the steering angle is divided into the unit of 0.01 degrees, for example, and such a detailed unit is to be controlled. However, highly precise control is demanded, expensive devices are needed, the development cycle of the system is long, and the total cost will be unreasonable.

On the other hand, in the configuration in which the steering angular velocity of the steering wheel is solely used to control the steering assist force, the physical quantity to be detected is an angular velocity. Hence, as compared with the control based on the steering angle, the intervention timing of the steering assist force can be shortened. However, in the control with the angular velocity, the lateral acceleration to be applied to the vehicle is large. In the region where the steering velocity is fast, the steering assistance becomes excessive and a steering feel becomes too light. Also, to deal with this issue, a conceivable measure is that the control intervention capability is improved by dividing the resolution into more details, as described above. However, since there is a limit in accuracy of a resolver for detecting the motor torque, the stiffness requirement and the sensitivity has a trade-off relationship and it is difficult to balance them. Besides, if the steering assist force is set weaker without careful consideration, even when a strong assist force is needed, such a weaker steering assist force will be exerted and the steering feel will become heavier.

Further, in the configuration where the steering angle of the steering wheel and the steering angular velocity are switched depending on the situation and used for control, switching cannot be done smoothly by a difference in any vehicle speed or operational input, or on a scene of inputting a disturbance. Hence, it is difficult to exhibit an ideal property.

One or more embodiments of the present invention provides a steering force controller configured to give a driver a more linear steering feel without a considerable increase in cost.

According to one or more embodiments of the present invention, a steering angular velocity, a steering angle, and a vehicle speed of a vehicle are detected. A main control matrix in which a first output value is set in accordance with the steering angular velocity and the vehicle speed and a subsidiary control matrix in which a second output value is set in accordance with the steering angle and the vehicle velocity are prepared. A control quantity for steering assistance is obtained by multiplying a first output value obtained by referring to the main control matrix based on the steering angular velocity and the vehicle speed by a second output value obtained by referring to the subsidiary control matrix based on the steering angle and the vehicle speed, so as to control a steering assist force control unit configured to generate a larger steering assist force in a steering system as the control quantity becomes larger. In such a situation, the main control matrix is configured such that, as the steering angular velocity is increased, the first output value is increased. In addition, the subsidiary control matrix is configured such that, as the steering angle is increased, the second output value is decreased.

According to one or more embodiments of the present invention, not only the main control matrix but also the subsidiary control matrix are provided. By correcting the first output value obtained from the main control matrix with the second output value obtained from the subsidiary control matrix, it is made possible to control the steering assist force with a property that is not achievable by only the main control matrix.

In addition, it is possible to give a driver a more linear steering feel.

DETAILED DESCRIPTION

Embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.
(Configuration)

Figure 1:
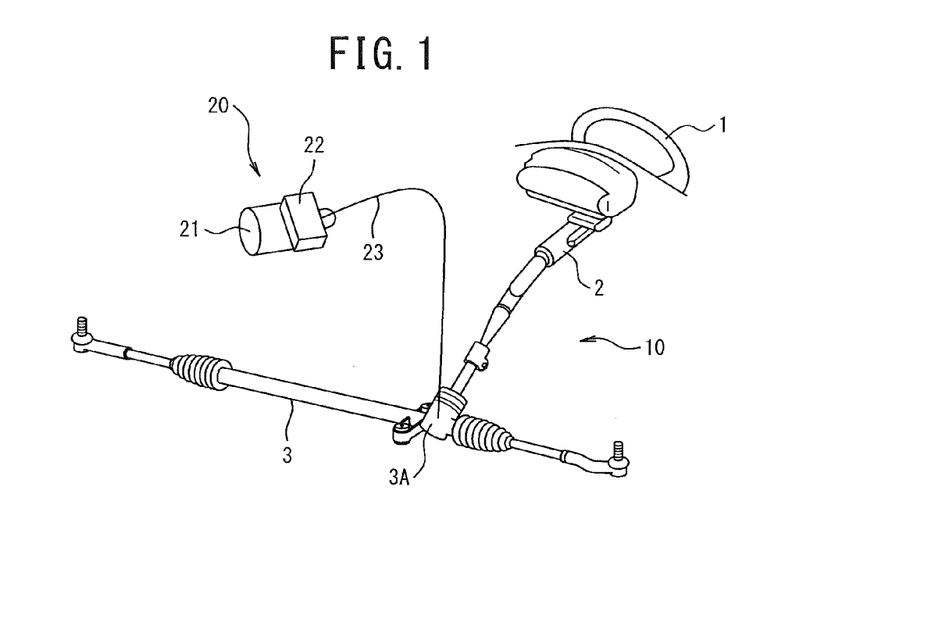
FIG. 1 is a view illustrative of a power steering device according to one or more embodiments of the present invention.
Figure 2:
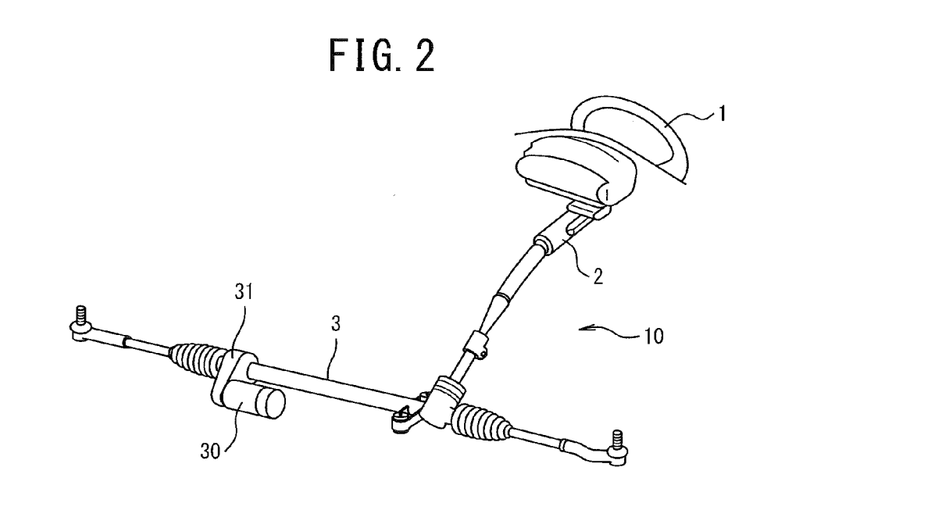
FIG. 2 is a view illustrative of a power steering device according to one or more embodiments of the present invention.
Figure 3:
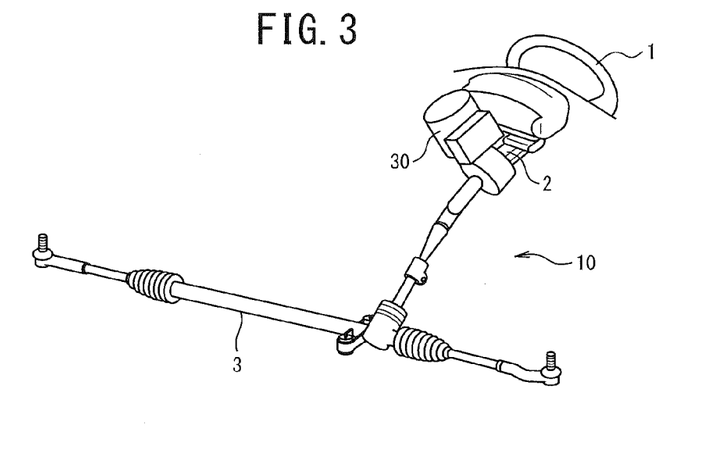
FIG. 3 is a view illustrative of a power steering device according to one or more embodiments of the present invention.

FIG. 1 to FIG. 3 are perspective views illustrative of the whole configuration of a power steering device to which a steering force controller according to one or more embodiments of the present invention is applicable. That is to say, the power steering device illustrated in FIG. 1 is configured to apply the steering assist force to a steering system 10 including a steering wheel 1, a steering column 2, and a rack shaft 3 through a hydraulic cylinder 3A arranged at the rack shaft 3, by a control unit 20 including an electric motor 21, a hydraulic pump 22, a pipe arrangement 23, and an ECU (i.e., Electronic Control Unit). The power steering device illustrated in FIG. 2 is configured to convert the torque of an electric motor 30 arranged along the rack shaft 3 into an advance or retreat force through a torque transfer mechanism 31 configured with a reduction gear, a ball screw and the like, and to apply the force to the rack shaft 3 as a steering assist force. The power steering device illustrated in FIG. 3 is configured such that the electric motor 30 and the ECU are arranged at the steering column 2. That is to say, the steering force controller according to one or more embodiments of the present invention is applicable to various types of hydraulic power steering devices or electrically-assisted power steering devices, as illustrated in FIG. 1 to FIG. 3.

Figure 4:
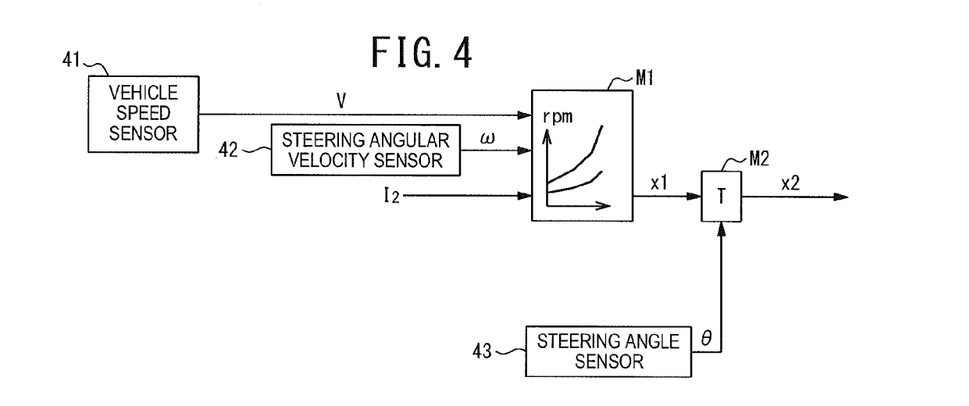
FIG. 4 is a block diagram illustrative of a control configuration according to one or more embodiments of the present invention.

FIG. 4 is a block diagram illustrative of a functional configuration of the ECU in each of the above-described power steering devices, including a main control matrix M1, a subsidiary control matrix M2, a vehicle speed sensor 41 configured to detect a vehicle speed V, a steering angular velocity sensor 42 configured to detect a steering angular velocity ω, and a steering angle sensor 43 configured to detect a steering angle θ.

The main control matrix M1 is a control map in which the steering angular velocity ω (i.e., first physical quantity) and the vehicle speed V (i.e., third physical quantity) are set as displacements. In other words, when the detected steering angular velocity ω and the detected vehicle speed V are input, a steering instruction signal x1 (i.e., first output value) suited for the input values is output. It is to be noted that, according to one or more embodiments of the present invention, an actual current value 12 is configured to be supplied to the main control matrix M1, as a signal representing an actual torque of the electric motor included in the power steering device, and a difference between the actual current value 12 and a target current value corresponding to the steering angular velocity ω which is a target is output as the steering instruction signal x1.

In the steering force controller in one technology, the steering instruction signal x1 is supplied to the electric motor in the power steering device without change. In one or more embodiments of the present invention, however, the steering instruction signal x1 is corrected by a value (i.e., second output value) read from the subsidiary control matrix M2, and a final steering instruction signal x2 is generated. The final steering instruction signal x2 is configured to be supplied to the electric motor in the power steering device.

Then, the subsidiary control matrix M2 is a control map in which the steering angle θ (i.e., second physical quantity) and the vehicle speed V (i.e., third physical quantity) are set as displacements.

Figure 5:
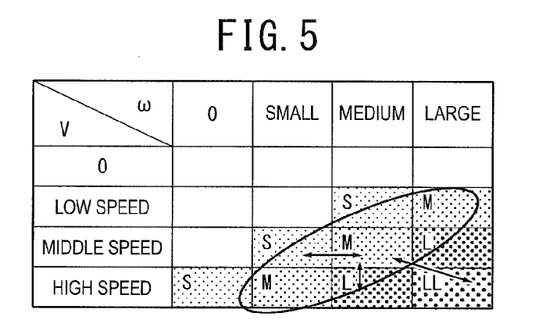
FIG. 5 is a conceptual view of a main control matrix.

FIG. 5 is a view illustrative of a simple example of the main control matrix M1. The map is configured to include four phases (i.e., 0, small, medium, and large) of the steering angular velocity ω, and four phases of (i.e., 0, low speed, medium speed, and high speed) of the vehicle speed V. In each cell, a value of the steering instruction signal x1 is stored. In this example of FIG. 5, the value of each cell is conceptually represented by S, M, L, or LL in code, but a numeric value is entered in fact.

Figure 6:
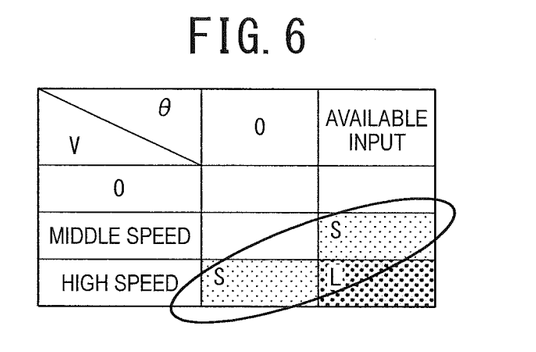
FIG. 6 is a conceptual view of a subsidiary control matrix.

FIG. 6 is a view illustrative of a simple example of the subsidiary control matrix M2. The map is configured to include two phases (i.e., 0 and input presence) of the steering angle θ and three phases (i.e., 0, medium speed, and high speed) of the vehicle speed V. In each cell, a value for correction is stored. In this example of FIG. 6, the value in each cell is conceptually represented by S or L in code, but a numeric value is entered in fact.

It is to be noted that as to physical quantities included in each of the matrices M1 and M2, in addition to the steering angular velocity ω and the steering angle θ, a lateral acceleration generated at the vehicle, a change rate in the lateral acceleration, a yaw rate, a change rate in the yaw rate, a rotational difference in left and right driven wheels, or a vehicle rolling quantity may be applicable. In other words, like the physical quantities that have been exemplified, any physical quantity that can be considered to represent the cornering property of the vehicle is applicable, that is, any physical quantity is applicable as far as it is caused by the turning of the vehicle. Two or more physical quantities may be combined, and a more linear steering feel is obtainable by combining together.

Herein, as illustrated in FIG. 4, when the subsidiary control matrix M2 is represented in a code T, an auxiliary assist force to be demanded is F, and one cell of the subsidiary control matrix M2 is extracted, $$F = f(d\theta/dt) \times f(T)$$

$$(\text{or, } F = f(d\theta/dt) \times T,$$

$$\text{Or } F = d\theta/dt \times T \times kx)$$

is satisfied. It is to be noted that kx represents coefficients k1, k2, . . . , and kx determined by the subsidiary control matrix M2.

The left part in the multiplication on the right side in each of the above expressions is a value obtained from the main control matrix M1, whereas the right part is a value obtained from the subsidiary control matrix M2.

Figure 7:
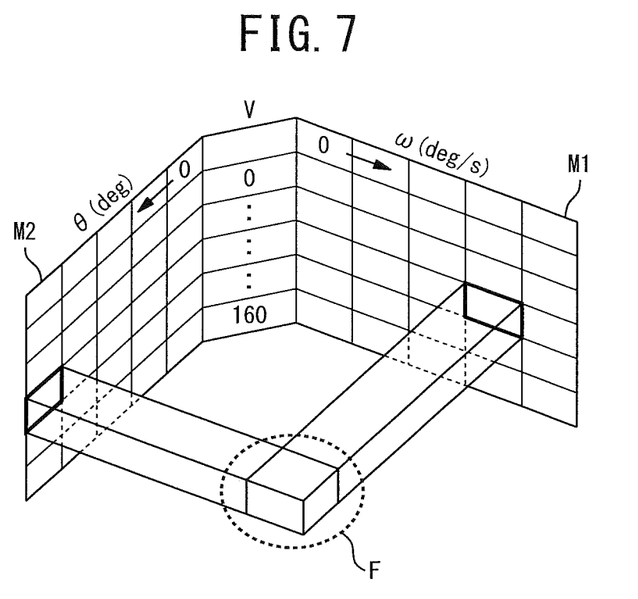
FIG. 7 is a conceptual view illustrative of a relationship between the two matrices and an auxiliary assist force.

FIG. 7 illustrates a concept of the above operational expressions for obtaining the auxiliary assist force F based on the main control matrix M1 and the subsidiary control matrix M2. That is, one of the values on the right side of the above expression is determined in the main control matrix M1 based on the steering angular velocity ω and the vehicle speed V, The other of the values on the right side of the "circle room" is determined in the subsidiary control matrix M2 based on the steering angle θ and the vehicle speed V, The auxiliary assist force F will be determined by using the two values.

Figure 8:
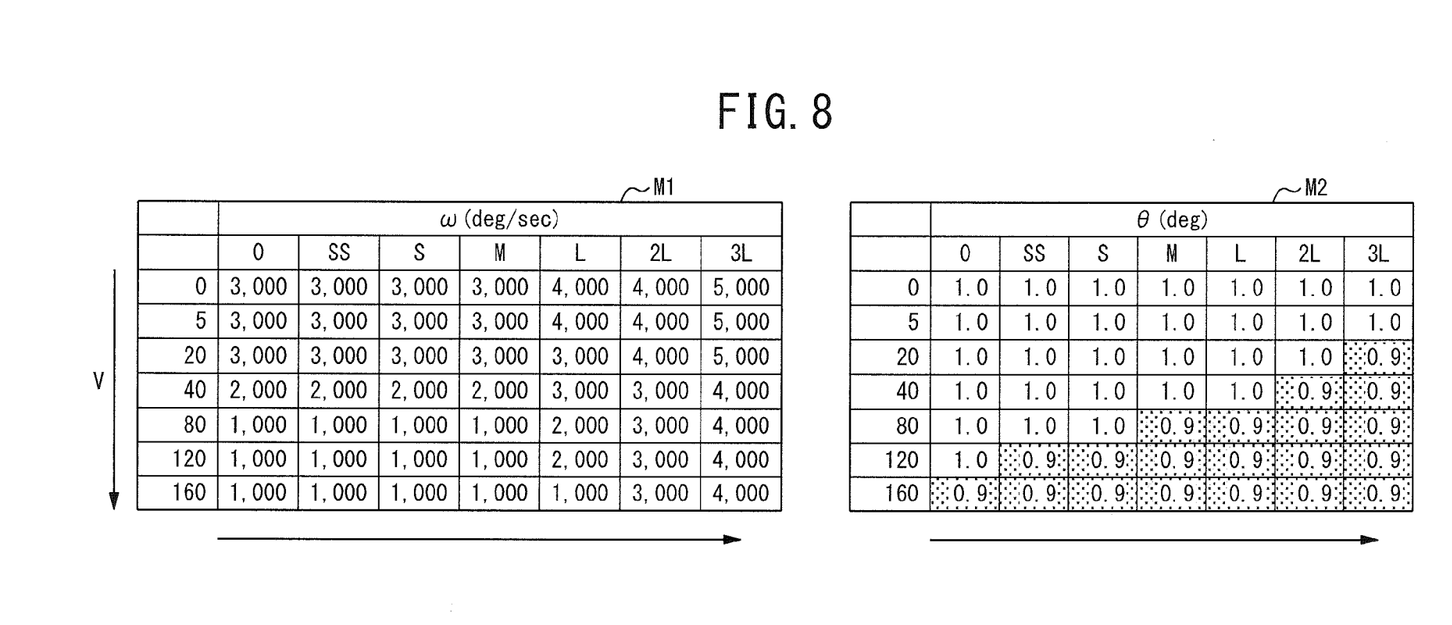
FIG. 8 is a view illustrative of specific examples of each of the matrices.

FIG. 8 is a view illustrative of specific examples of values of the main control matrix M1 and the subsidiary control matrix M2. The main control matrix M1 is a map set with the steering angular velocity ω and the vehicle speed V, whereas the subsidiary control matrix M2 is a map set with the steering angle θ and the vehicle speed V.

In the main control matrix M1, the steering angular velocity ω is assumed to take seven phases of 0 to 3 L, the vehicle speed V is assumed to take seven phases of 0, 5, 20, 40, 80, 120, and 160 (km/h), and thus there are 49 cells. Also, in the subsidiary control matrix M2, the steering angle θ and the vehicle speed V each have seven phases, and thus there are 49 cells.

It is to be noted, however, that in the main control matrix M1, the value of each cell is set comparatively freely depending on the steering angular velocity ω and the vehicle speed V at any given time in a similar manner to the case where the steering angular velocity ω is solely used in one technology. Accordingly, some cells adjacent to each other horizontally, vertically, or obliquely have a difference of two or three times.

In brief, the property based on the steering angular velocity ω as represented in the main control matrix M1 is set to generate a large steering assist force for making a large operation for sudden turning.

In contrast, in the subsidiary control matrix M2, the value of each cell is set to either "1.0" or "0.9". In addition, the cells where "1.0" is set and the cells where "0.9" is set are arranged to divide the whole regions into regions as if a boundary line extends from the lower left to the upper right. For this reason, the value of each cell in the subsidiary control matrix M2 is set such that adjacent cells have the same values or differences of the adjacent cells are small (i.e., "0.1" or the ratio of 10% or so). Therefore, when focusing on one cell in the vicinity of the boundary line, the one cell and some of its surrounding cells (i.e., the cells adjacent to each other horizontally, vertically, or obliquely) have the same values, but the others of its surrounding cells have small differences from the one cell such that subtraction results from the adjacent cells are slightly increased or decreased from the one cell.

Accordingly, when a correction is made by, for example, multiplication with a value obtained from the subsidiary control matrix M2, the values after the correction come to be linked with the surrounding values linearly. In other words, as indicated by arrows in the main control matrix M1 of FIG. 5, in a case where numeric values changes across the cells, such numeric values come to be linked more linearly in linear shape, logarithm, exponent, or moving average, even when such numeric values change.

In brief, the correction values based on the steering angle θ indicated in the subsidiary control matrix M2 are set such that in making a large operation under a certain condition, the multiplication control is made while carefully considering the sudden turning, and even the obliquely arranged numeric values are not stepped, that is, set to change linearly.

In addition, as to the main control matrix M1 and the subsidiary control matrix M2, more precise control is enabled by increasing the number of the cells included in the matrix.

(Operations)

Hereinafter, operations of the steering force controller according to one or more embodiments of the present invention will be described.

Figure 9:
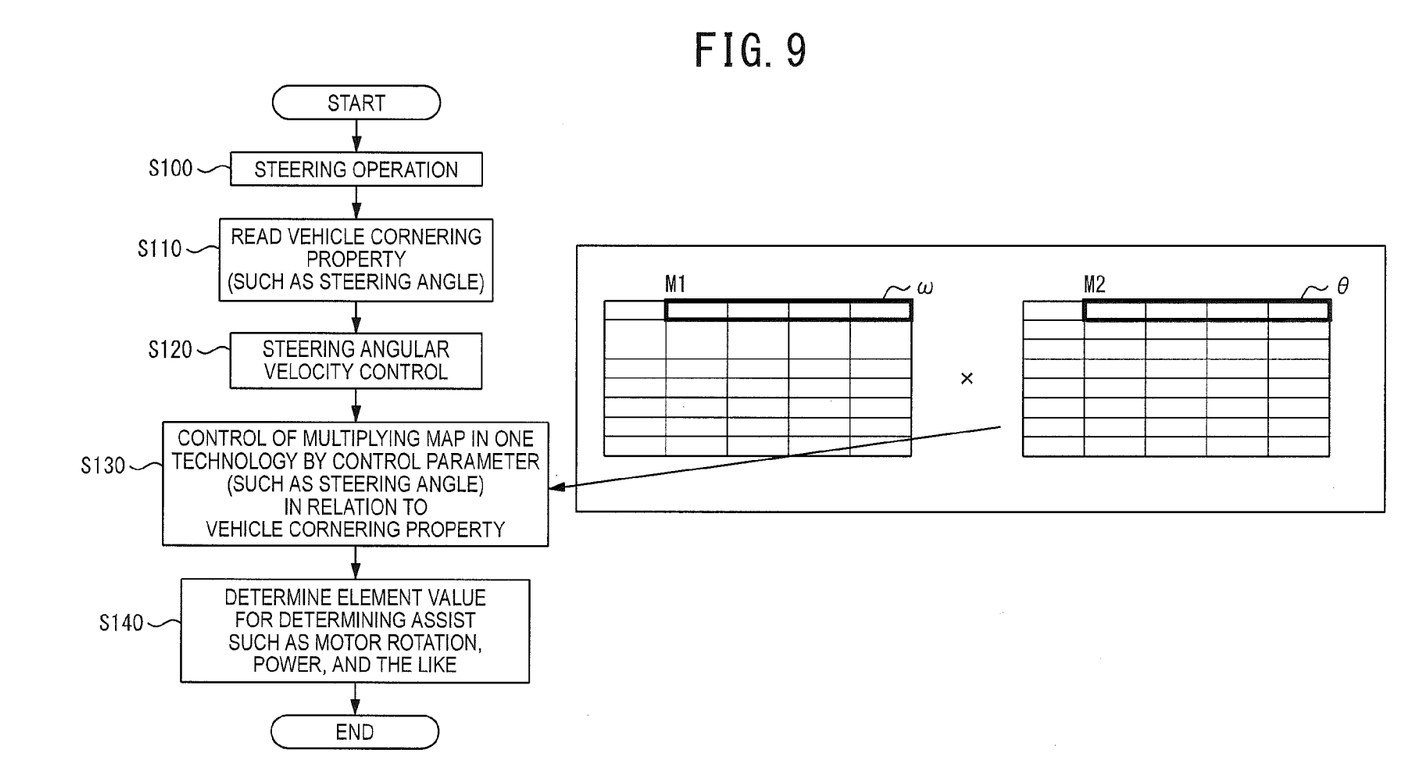
FIG. 9 is a flowchart illustrative of operations according to one or more embodiments of the present invention.

FIG. 9 is a view illustrative of a concept of operations of the steering force controller together with a flowchart. When a steering operation (in step S100) is confirmed, processing goes to step S110, and a physical quantity representing the cornering property of the vehicle is read. To be specific, according to one or more embodiments of the present invention, the steering angular velocity ω and the steering angle θ are read. It is to be noted that, in step S110, the vehicle speed V is also read.

Then, processing goes to step S120, by reference to the main control matrix M1, the steering instruction signal x1 (i.e., first output value) is obtained based on the steering angular velocity ω and the vehicle speedy. When the steering instruction signal x1 obtained in step S120 is output without change as a control instruction signal of the power steering device, the steering angular velocity control will be made, in one technology.

According to one or more embodiments of the present invention, however, processing goes to step S130, and a correction value by reference to the subsidiary control matrix M2 based on the steering angle θ and the vehicle speed V is read and such a correction value is multiplied by the steering instruction signal x1 obtained in step S120, so that the final steering instruction signal x2 is calculated.

Then, processing goes to step S140, a current value or the like of the electric motor that determines the steering assist force is determined based on the final steering instruction signal x2, and the determined current value is output to an actuator such as the electric motor of the power steering device, so that the steering assist force is applied to the steering system 10.

Figure 10:
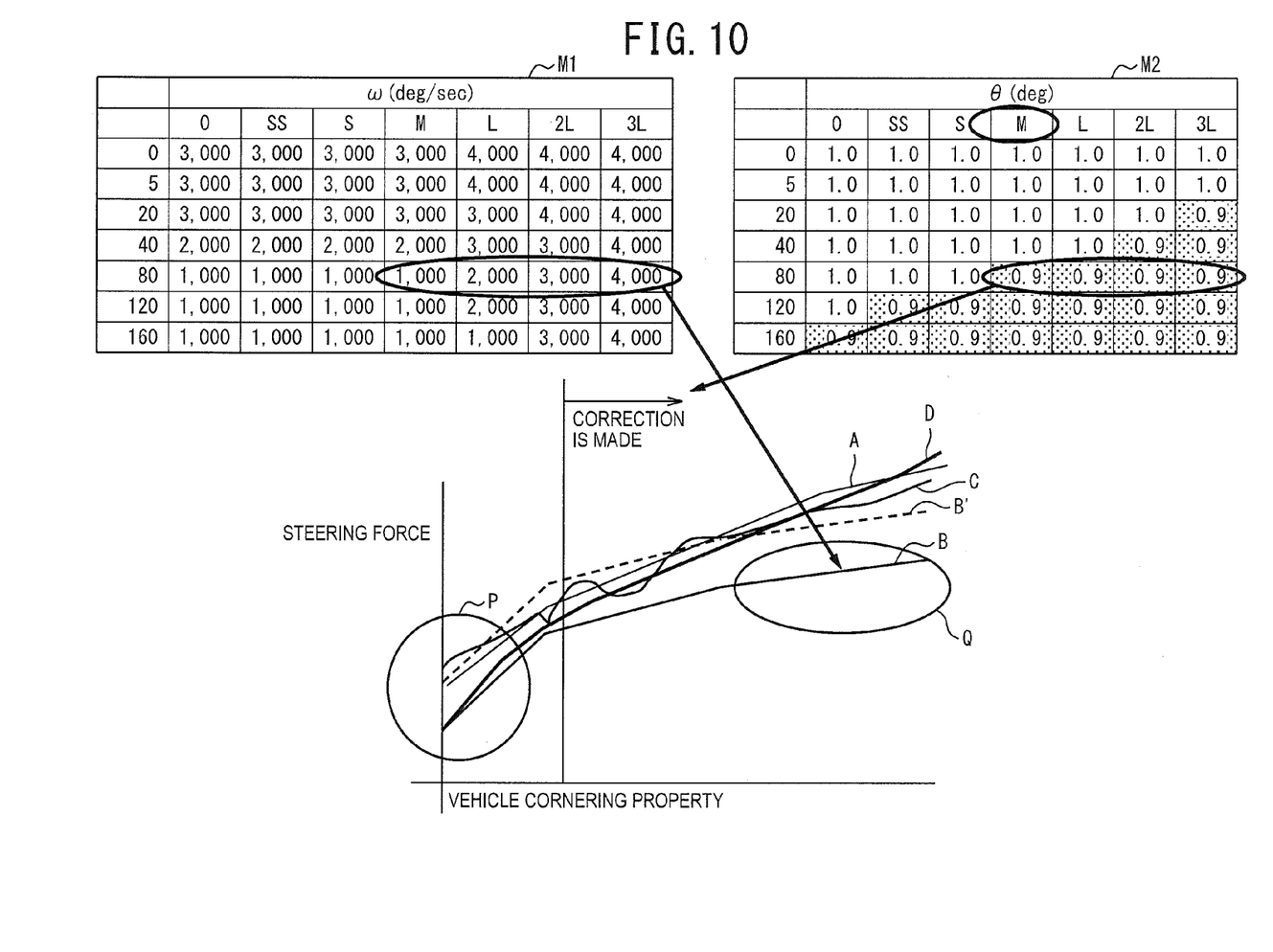
FIG. 10 is a view illustrative of one or more embodiments of the present invention.

FIG. 10 is a view illustrative of an operation according to one or more embodiments of the present invention in detail, and is illustrative of the main control matrix M1, the subsidiary control matrix M2, and a property diagram between a vehicle cornering property and an operation force (i.e., steering operation force).

In other words, the property diagram includes a property A indicative of a property when the steering angle θ is solely used for control, a property B indicative of a property when the steering angular velocity ω is solely used for control, a property B' indicative of a property when the steering assist force is made smaller over the whole regions in the control where the steering angular velocity ω is solely used, a property C indicative of a property when the steering angle θ and the steering angular velocity ω are switched and used for control, and a property D indicative of an ideal property that can be achieved by the steering force control according to one or more embodiments of the present invention.

As indicated by the property A, in the control where the steering angle θ is solely used, the startup of the steering assist force is delayed in a region P where the steering angle θ is small. Hence, a comparatively large operation force is demanded and the steering feel to the driver becomes heavy.

As indicated by the property B, in the control where the steering angular velocity ω is solely used, the steering assist force becomes excessive in a region Q where the steering angular velocity ω is large, and the steering feel to the driver becomes light.

As indicated by the property B', when the steering assist force is made smaller over the whole regions in the control where the steering angular velocity ω is solely used, the steering feel to the driver becomes heavier over the whole regions.

As indicated by the property C, when the steering angle θ and the steering angular velocity ω are switched and used for control, switching cannot be done smoothly by a change in the vehicle speed V, a subtle difference in operational input, or on a scene of inputting a disturbance. Hence, an ideal performance cannot be exhibited in some points.

On the other hand, according to the configuration according to one or more embodiments of the present invention, in the region P, since the control by the steering angular velocity ω is dominant, the startup is not delayed and the steering feels becomes lighter.

Also, when the steering angular velocity ω exceeds a level M, the correction by the value obtained from the subsidiary control matrix M2 is added. Hence, the steering assist force is modified to be small and the steering feel given to the driver becoming too light is avoided.

Accordingly, an ideal property D is available over the whole regions of the vehicle cornering property.

Herein, according to one or more embodiments of the present invention, the steering angular velocity sensor 42 configured to detect the steering angular velocity ω corresponds to a first detection unit, the steering angle sensor 43 configured to detect the steering angle θ corresponds to a second detection unit, and the vehicle speed sensor 41 configured to detect the vehicle speed V corresponds to a third detection unit. Processing of step S120 and step S130 correspond to a control quantity operation unit, and processing of step S140 corresponds to a steering assist force control unit. In addition, in the case where the lateral acceleration is used as the vehicle cornering property, an acceleration sensor configured to detect the lateral acceleration corresponds to a lateral acceleration detection unit, whereas in the case where a yaw rate is used as the vehicle cornering property, a sensor configured to detect the yaw rate corresponds to a yaw rate detection unit.

Modifications of Embodiments

When the value of the steering angular velocity ω, the lateral acceleration, the yaw rate, or the like exceed a predefined thresholds ωth1, for example, it may be determined that the vehicle is in an emergency avoidance travel state, and the control may be switched for the control by solely using one of the steering angular velocity ω, the steering angle θ, the lateral acceleration, or the like, to address the emergency avoidance.

Figure 11:
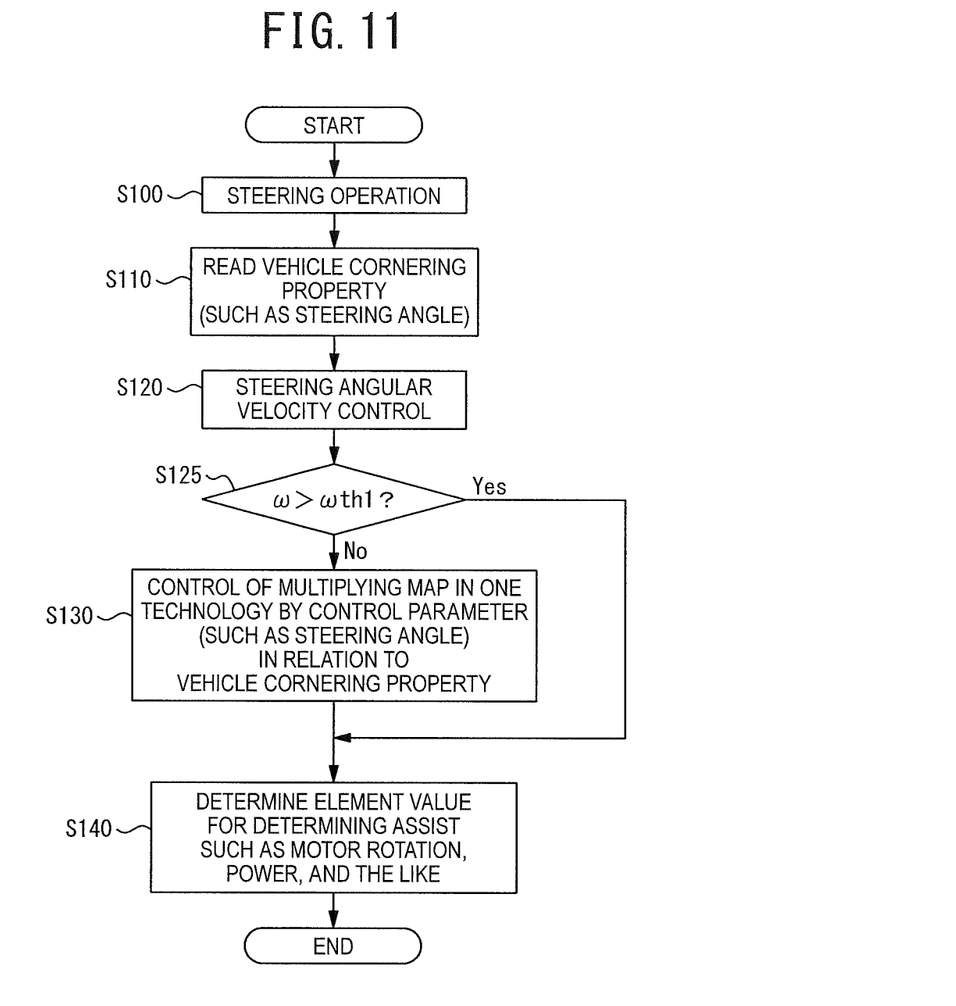
FIG. 11 is a flowchart illustrative of a variation of one or more embodiments of the present invention.

FIG. 11 is a flowchart illustrative of an example, in which when the steering angular velocity ω exceeds the threshold ωth1, it is determined that the vehicle is in an emergency avoidance travel state, and the control is switched for the control of solely using the steering angular velocity ω. That is, when the operations of step S100, step S110, and step S120 are completed, the processing goes to step S125, and determines whether or not the steering angular velocity ω exceeds the threshold ωth1. When this determination is "NO", the processing goes to step S130. However, when the determination of step S125 is "YES", the processing skips step S130, and goes to step S140, so that the control solely using the steering angular velocity ω is carried out. Accordingly, it is possible to improve the operations for the emergency avoidance.

In addition, when the steering angular velocity ω is smaller than a predefined threshold ωth2, instead of the configuration in one or more embodiments of the present invention, the control may be switched to the control solely using the steering angular velocity ω or the steering angle θ.

Figure 12:
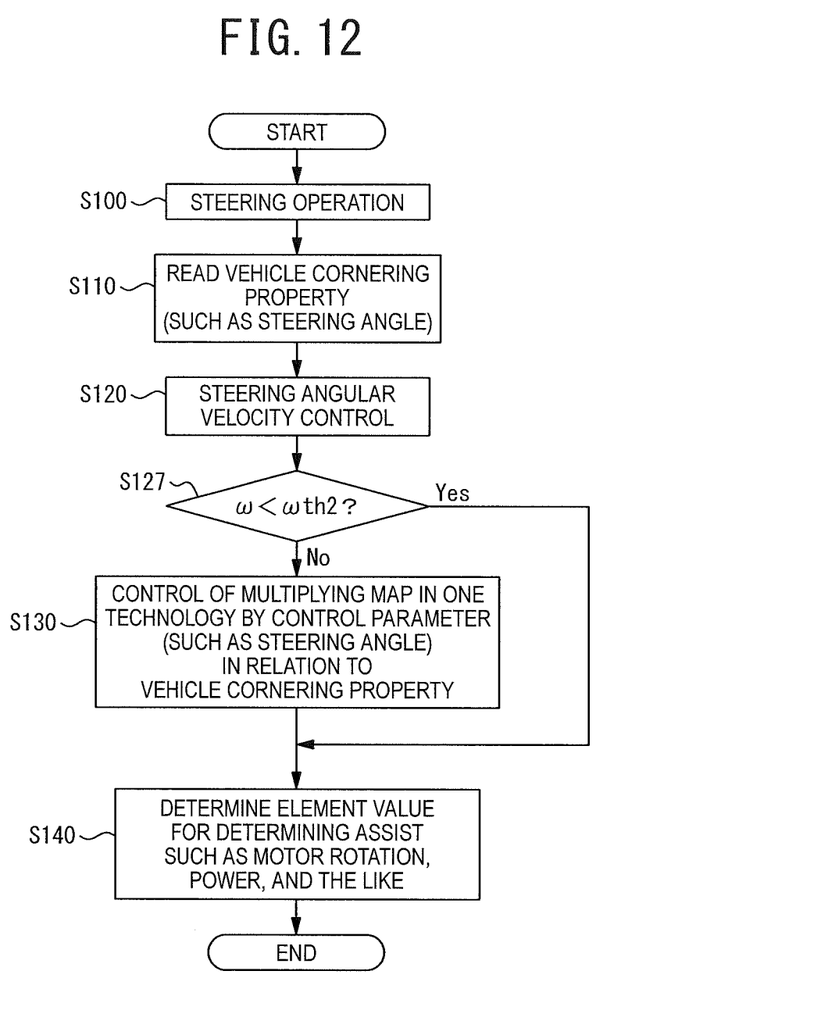
FIG. 12 is a flowchart illustrative of another variation of one or more embodiments of the present invention.

FIG. 12 is a flowchart illustrative of an example, in which when the steering angular velocity ω is smaller than the threshold ωth2, it is determined that the vehicle is in a startup timing of steering, and the control is switched for the control of solely using the steering angular velocity ω. That is, when the operations of step S100, step S110, and step S120 are completed, the processing goes to step S125, and determines whether or not the steering angular velocity ω is smaller than the threshold ωth2. When this determination is "NO", the processing goes to step S130. However, when the determination of step S125 is "YES", the processing skips step S130, and goes to step S140, so that the control of solely using the steering angular velocity ω is carried out. Accordingly, it is possible to improve the responsiveness at the start up timing of steering.

One or more embodiments of the present invention may have one or more of the following advantages.

(1) The steering angular velocity ω, the steering angle θ, and the vehicle speed V generated in the vehicle are detected. The main control matrix M1 that is set based on the steering angular velocity ω and the vehicle speed V and the subsidiary control matrix M2 that is set based on the steering angle θ and the vehicle speed V are provided. The control quantity for the steering assistance is obtained by use of the two matrices M1 and M2, so as to control the power steering device. It is thus possible to give a more linear steering feel to a driver over the whole regions of the vehicle cornering property.

(2) The value of each cell included in the subsidiary control matrix M2 is configured such that adjacent cells have the same values or subtraction results between the adjacent cells are slightly increased or decreased. It is thus possible to achieve the above-described linear steering feel with certainty.

(3) In particular, a first one of the cells included in the subsidiary control matrix and second ones of the cells horizontally, vertically, and obliquely adjacent to the first one of the cells have same values, and third ones of the cells that are not the second ones in the cells have subtraction results between the adjacent cells that are slightly increased or decreased from the first one of the cells. It is thus possible to achieve the linear steering feel with more accuracy.

(4) As the first physical quantity, one of the steering angle θ, the steering angular velocity ω, the lateral acceleration, the change rate in the lateral acceleration, the yaw rate, the change rate in the yaw rate, the rotational difference in left and right driven wheels, or the vehicle rolling quantity may be applicable. As the second physical quantity, another one of the steering angle θ, the steering angular velocity ω, the lateral acceleration, the change rate in the lateral acceleration, the yaw rate, the change rate in the yaw rate, the rotational difference in left and right driven wheels, or the vehicle rolling quantity may be applicable. Therefore, utilization of various sensors mounted on a vehicle enables the suppression of the cost increase.

(5) The vehicle speed V is applied as the third physical quantity, and necessary information is obtainable from the vehicle speed sensor 41 included in a normal vehicle. Hence, it is advantageous to the cost reduction.

(6) One of the steering angle and the steering angular velocity is set as the first physical quantity, the other of the steering angle and the steering angular velocity is set as the second physical quantity, and the vehicle speed is set as the third physical quantity. Therefore, such a combination is suited to achieve the steering force controller in the normal vehicle.

(7) When it is possible to determine from the steering angular velocity ω, the lateral acceleration, the yaw rate, or the like that the vehicle is in a state of emergency avoidance travel state, the control quantity may be obtained directly from one of the steering angle or the steering angular velocity. In such a case, the suitable control can be carried out for the emergency avoidance.

(8) When the steering angular velocity ω is smaller than the predefined threshold and the control quantity is directly obtained from one of the steering angle θ or the steering angular velocity ω, the responsiveness at the start up timing is sufficiently obtained. It is thus possible to obtain a sufficient effect by simple control.

Herein, only a limited number of embodiments have been described with reference to the drawings. However, the present invention is not limited to the above embodiments. It should be apparent that modifications and adaptations to those embodiments may occur to a person skilled in the art. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 steering wheel
2 steering column
3 rack shaft
3A hydraulic cylinder
10 steering system
20 control unit
21 electric motor
22 hydraulic pump
23 pipe arrangement
30 electric motor
31 torque transfer mechanism
41 vehicle speed sensor
42 steering angular velocity sensor,
43 steering angle sensor

The invention claimed is:

1. A steering force controller, comprising:
a first detection unit that detects a steering angular velocity of a vehicle;
a second detection unit that detects a steering angle of the vehicle;
a third detection unit that detects a vehicle speed of the vehicle;
a main control matrix in which a first output value is set based on the steering angular velocity and the vehicle speed;
a subsidiary control matrix in which a second output value is set based on the steering angle and the vehicle speed;
a control quantity operation unit that obtains a control quantity for steering assistance by multiplying the first output value obtained by referring to the main control matrix based on the steering angular velocity detected by the first detection unit and the vehicle speed detected by the third detection unit, by the second output value obtained by referring to the subsidiary control matrix based on the steering angle detected by the second detection unit and the vehicle speed detected by the third detection unit; and
a steering assist force control unit that generates a steering assist force in a steering system based on the control quantity obtained by the control quantity operation unit,
wherein the main control matrix is configured such that, as the steering angular velocity is increased, the first output value is increased, and
wherein the subsidiary control matrix is configured such that, as the steering angle is increased, the second output value is decreased.

2. The steering force controller according to claim 1, wherein values of cells included in the subsidiary control matrix are respectively configured such that adjacent cells have same values or subtraction results between the adjacent cells are slightly increased or decreased.

3. The steering force controller according to claim 2, wherein a first one of the cells included in the subsidiary control matrix and second ones of the cells horizontally, vertically, and obliquely adjacent to the first one of the cells have same values, and third ones of the cells that are not the second ones in the cells have subtraction results between the adjacent cells that are slightly increased or decreased from the first one of the cells.

4. The steering force controller according to claim 1, wherein the steering assist force control unit comprises:
an electric motor to which a current value in accordance with the control quantity is supplied; and
a hydraulic pump that is driven by the electric motor, to generate a hydraulic pressure, and to apply the steering assist force.

5. The steering force controller according to claim 1, wherein, when the vehicle is determined to be in an emergency avoidance travel state, the control quantity operation unit directly obtains the control quantity from one of the steering angle or the steering angular velocity.

6. The steering force controller according to claim 5, wherein, when the steering angular velocity exceeds a predefined threshold, the control quantity operation unit determines that the vehicle is in the emergency avoidance travel state.

7. The steering force controller according to claim 5, further comprising:
a lateral acceleration detection unit that detects a lateral acceleration generated in the vehicle,
wherein, when the lateral acceleration detected by the lateral acceleration detection unit exceeds a predefined threshold, the control quantity operation unit determines that the vehicle is in the emergency avoidance travel state.

8. The steering force controller according to claim 5, further comprising:
a yaw rate detection unit that detects a yaw rate generated in the vehicle,
wherein, when the yaw rate detected by the yaw rate detection unit exceeds a predefined threshold, the control quantity operation unit determines that the vehicle is in the emergency avoidance travel state.

9. The steering force controller according to claim 1, wherein, when the steering angular velocity is smaller than a predefined threshold, the control quantity operation unit directly obtains the control quantity from one of the steering angle or the steering angular velocity.

* * * * *